(12) United States Patent
Osawa et al.

(10) Patent No.: US 8,967,017 B2
(45) Date of Patent: Mar. 3, 2015

(54) STEERING DEVICE

(71) Applicant: Yamada Manufacturing Co., Ltd, Kiryu-shi, Gunma (JP)

(72) Inventors: Toshihito Osawa, Isesaki (JP); Toru Sekiguchi, Isesaki (JP); Katsutoshi Tsuji, Isesaki (JP)

(73) Assignee: Yamada Manufacturing Co., Ltd., Kiryu-Shi, Gunma (JP)

( * ) Notice: Subject to any disclaimer, the term of this patent is extended or adjusted under 35 U.S.C. 154(b) by 35 days.

(21) Appl. No.: 13/852,908

(22) Filed: Mar. 28, 2013

(65) Prior Publication Data

US 2013/0263686 A1    Oct. 10, 2013

(30) Foreign Application Priority Data

Apr. 6, 2012   (JP) .................................. 2012-87976

(51) Int. Cl.
   *B62D 1/184*    (2006.01)
   *B62D 1/187*    (2006.01)

(52) U.S. Cl.
   CPC ...................................... *B62D 1/184* (2013.01)
   USPC .............................. 74/495; 74/493; 280/775

(58) Field of Classification Search
   CPC .......... B62D 1/18; B62D 1/184; B62D 1/185; B62D 1/187; B62D 1/195
   USPC ..................... 74/493, 495; 280/775
   See application file for complete search history.

(56) References Cited

U.S. PATENT DOCUMENTS

| 6,467,807 | B2 * | 10/2002 | Ikeda et al. ................... 280/775 |
| 6,990,874 | B2 * | 1/2006 | Murakami et al. .............. 74/493 |
| 7,726,691 | B2 | 6/2010 | Yamada |
| 8,256,322 | B2 * | 9/2012 | Takezawa et al. .............. 74/493 |
| 8,505,407 | B2 * | 8/2013 | Nomura et al. ................. 74/493 |
| 8,601,901 | B2 * | 12/2013 | Ishii et al. ....................... 74/493 |
| 8,746,740 | B2 * | 6/2014 | Tanaka .......................... 280/777 |
| 2003/0000330 | A1 | 1/2003 | Murakami et al. |
| 2006/0028010 | A1 | 2/2006 | Yamada |
| 2013/0213174 | A1 * | 8/2013 | Suzuki et al. ................... 74/493 |
| 2014/0076091 | A1 * | 3/2014 | Yokota et al. ................... 74/493 |
| 2014/0144277 | A1 * | 5/2014 | Kakishita ........................ 74/493 |

FOREIGN PATENT DOCUMENTS

| EP | 1 125 820 A2 | 8/2001 |
| JP | 2006-69524 A | 3/2006 |

OTHER PUBLICATIONS

European Search Report dated Jul. 24, 2013.

* cited by examiner

*Primary Examiner* — Paul N Dickson
*Assistant Examiner* — Laura Freedman
(74) *Attorney, Agent, or Firm* — McGinn IP Law Group, PLLC (57) ABSTRACT

A steering device includes a housing constituted by an enclosing main body section, a separation section formed on two sides of on the lower side of the enclosing main body section along the axial direction thereof, and clamping sections formed respectively on two sides of the enclosing main body section so as to face each other in the lateral direction of the separation section; a fixed bracket having fixed side sections that clamp the housing at two sides in the lateral direction; a clamp that clamps the two clamping sections of the housing and the two fixed side sections of the fixed bracket; an outer pipe having at the axially front side thereof a slit formed in the axial direction; and an inner pipe inserted into the inner circumferential side of the outer pipe.

19 Claims, 10 Drawing Sheets

Fig.9A PRESENT INVENTION

Fig.10A RELATED ART

Fig.10C VIEW FROM BELOW

Fig.10B

STEERING DEVICE

BACKGROUND OF THE INVENTION

1. Field of the Invention

The present invention relates to a steering device equipped with a tilt and telescopic adjustment mechanism, and more particularly to a steering device of a structure in which the clamping state during the tilt and telescopic adjustment is reinforced and which excels as a whole in durability.

2. Description of the Related Art

A variety of steering devices equipped with a tilt-telescopic mechanism have been developed. Recently developed devices have a structure in which an outer pipe and an inner column are locked and unlocked with a clamp member during tilt and telescopic adjustment. A device of this kind is disclosed in Japanese Patent Application Publication No. 2006-69524. The device according to Japanese Patent Application Publication No. 2006-69524 is briefly described below. In the explanation below, the reference numerals assigned to the components are those described in Japanese Patent Application Publication No. 2006-69524 and they are included in parentheses to distinguish them from the reference numerals of the present application.

In the steering column device described in Japanese Patent Application Publication No. 2006-69524, a hollow cylindrical outer column (1) is mated with the rear side of an inner column (2), as viewed along the vehicle body (same hereinbelow), so that the outer column can slide in the axial direction. The outer column (1) is attached to a vehicle body (6) with an upper-side vehicle body attachment bracket (3). A slit (14) is formed in the lower surface of the outer column (1). The slit (14) is formed from an end surface (17) on the front side of the outer column (1).

On the front side of the inner column (2), the lower-side vehicle body attachment bracket (7) is attached to the vehicle body (6), and a tilt central shaft (21) fixed to the front side of the inner column (2) is tiltably supported by the lower-side vehicle body attachment bracket (7). A pair of left and right flanges (31A), (31B) for attaching the upper-side vehicle body attachment bracket (3) to the vehicle body (6) is formed in the upper section of the upper-side vehicle body attachment bracket (3).

The flanges (31A), (31B) are formed integrally, and at the inner side surfaces (321A), (321B) of the left and right side plates (32A), (32B) extending in the up-down direction, a clamp member (8) is clamped to allow for telescopic and tilt movement. A circular-arc inner circumferential surface (82) formed at the inner side of the clamp member (8) encircles an outer circumference (11) of the outer column (1). The clamp member (8) is disposed at a position such as to enclose the slit (14) of the upper column (1) from both sides.

A separation location is present at the lower side of the clamp member (8). A slit, which is the separation location of the clamp member (8), is formed along the lower surface side of the clamp member (8) similarly to the slit (14) of the outer column (1). Where the clamp member (8) is clamped, the outer column (1) is reduced in diameter, and the inner column (2) is held.

After the clamp member (8) and the outer column (1) have been unclamped from the upper-side vehicle body attachment bracket (3), a steering wheel (5) is grasped and the outer column (1) and the clamp member (8) are slid in the axial direction with respect to the inner column (2) to adjust to the desired telescopic position. At the same time, they are adjusted to the desired tilt position by rotation about the tilt central shaft (21). Then, the clamp member (8) is clamped to the upper-side vehicle body attachment bracket (3).

SUMMARY OF THE INVENTION

The problems associated with the configuration described in Japanese Patent Application Publication No. 2006-69524 are described below. FIG. 10 appended to the present application is a schematic drawing illustrating the contents disclosed in Japanese Patent Application Publication No. 2006-69524. FIG. 10 uses the same reference numerals as used in Japanese Patent Application Publication No. 2006-69524, but they are enclosed in parentheses to distinguish them from the reference numerals of the present invention. First, since the slit of the clamp member (8) and the slit (14) of the outer column (1) are formed at the lower surface side, where a load is applied in the tilt (up-down) direction, the front-side end surface (17), which is the end surface of the slit (14) that has the lowest strength in the outer column (1) can be expanded and deformed (see FIGS. 10B and 10C).

Figure 10A:
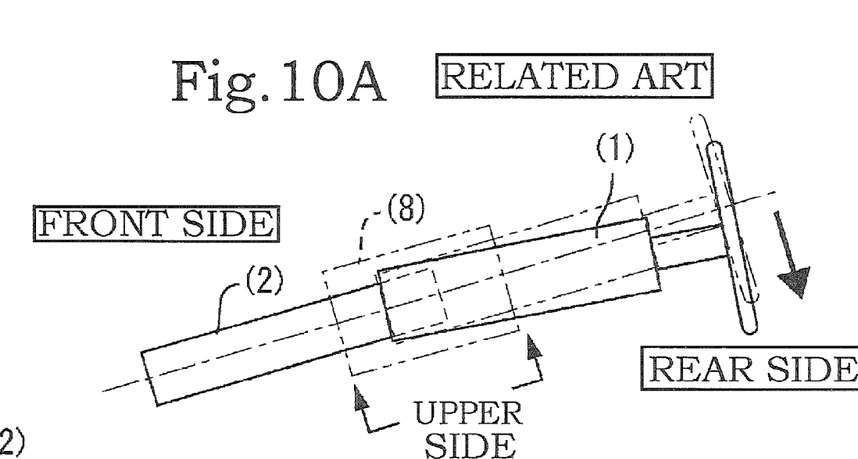
FIG. 10A is a simplified view emphasizing the state in which the outer pipe and inner pipe are mutually bent in the configuration in accordance with the related art.
Figure 10B:
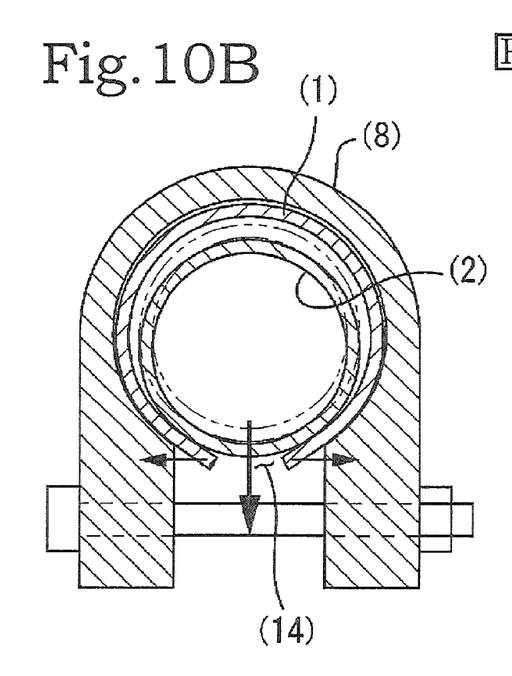
FIG. 10B is a simplified view illustrating the state in which the slit is expanded by the inner column.
Figure 10C:
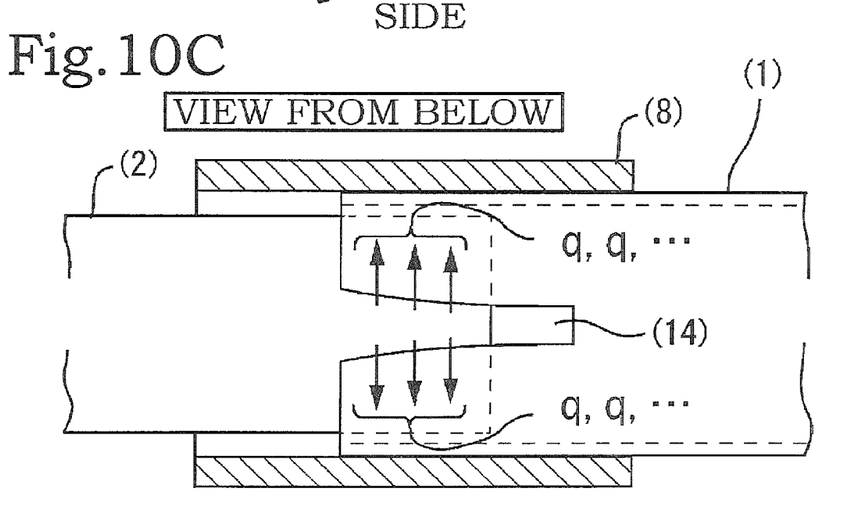
FIG. 10C is a bottom view of the state shown in FIG. 10A.

It means that where an external load acts upon the steering wheel (5) in the tilt direction after the tilt and telescopic adjustment of the steering device has been completed, a load is applied such that causes mutual bending of the outer column (1) and the inner column (2) (see FIG. 10A). The inner column (2) is disposed at the formation location of the slit (14), and where the aforementioned load is applied, the inner column (2) bites into the slit (14) of the outer column (1), thereby creating pushing forces (q) that expand the slit (14) in the lateral direction.

As mentioned hereinabove, the slit, which is a separation location, is positioned on the lower surface side of the clamp member (8), and the deformation of the slit (14) that is expanded by the inner column (2) cannot be inhibited. For this reason, the front end section of the slit (14) of the outer column (1) is expanded by the pushing forces (q) and the outer column (1) is deformed (see FIGS. 10B and 10C), thereby causing the deterioration of the outer column (1).

In the fifth example of Japanese Patent Application Publication No. 2006-69524, a slit-shaped engagement recess (12) is formed in the upper surface in addition to the slit (14) formed in the lower surface of the outer column (1). In this example, where a load is applied in the tilt direction, the front end surface (17) of the slit (14) can be also expanded and deformed. Further, since the slits are formed in two locations in the circumferential direction of the outer column (1), the rigidity of the outer column (1) is reduced.

The configuration has also been disclosed in which the front end section of the slit (14) is not open at the front end surface (17) of the upper column (1), and a closed end section that is cut in the direction orthogonal to the slit (14) is formed in order to prevent the deformation of the front end surface (17). However, such a structure is difficult and expensive to manufacture. The object of (the technical problem to be resolved by) the present invention is to prevent the decrease in rigidity of, for example, the outer pipe and to attain this object with a very simple configuration.

Accordingly, the inventors have conducted a comprehensive study aimed at the resolution of the above-described problem. The result obtained demonstrates that the above-described problem is resolved by a steering device according to the first aspect of the present invention, including: a housing constituted by an enclosing main body section, a separation section formed on the lower side of the enclosing main body section along the axial direction thereof, and clamping sections formed respectively on two sides of the enclosing main body section so as to face each other in the lateral direction of the separation section; a fixed bracket having fixed side sections that clamp the housing at two sides in the lateral direction; a clamp that clamps the two clamping sections of the housing and the two fixed side sections of the fixed bracket; an outer pipe having on an axially front side thereof a slit formed in the axial direction; and an inner pipe inserted into an inner circumferential side of the outer pipe, wherein the slit of the outer pipe is configured to be positioned on the upper side and be enclosed by the enclosing main body section.

In accordance with the second aspect of the present invention, the above-described problem is resolved by the steering device according to the first aspect, wherein an axially rear end section of the inner pipe is configured to be positioned inside the enclosing main body section of the housing. In accordance with the third aspect of the present invention, the above-described problem is resolved by the steering device according to the first or second aspect, wherein an axially front end section of the outer pipe is configured to be positioned inside the enclosing main body section of the housing.

In accordance with the fourth aspect of the present invention, the above-described problem is resolved by the steering device according to any one of the first to third aspects, wherein a stopper member is mounted along the axial direction at a diametrically lower position with respect to the slit of the outer pipe, and the stopper section is positioned in the separation section.

In accordance with the fifth aspect of the present invention, the above-described problem is resolved by a steering device including: a housing constituted by an enclosing main body section, a separation section formed on the upper side of the enclosing main body section along the axial direction thereof, and clamping sections formed respectively on two sides of the enclosing main body section so as to face each other in the lateral direction of the separation section; a fixed bracket having fixed side sections that clamp the housing at two sides in the lateral direction; a clamp that clamps the two clamping sections of the housing and the two fixed side sections of the fixed bracket; an outer pipe having on an axially front side thereof a slit formed in the axial direction; and an inner pipe inserted into an inner circumferential side of the outer pipe, wherein the slit of the outer pipe is configured to be positioned on the lower side and be enclosed by the enclosing main body section.

According to the first aspect of the present invention, even if a load in the tilt direction is applied to the slit formation location of the outer pipe after the tilt and telescoping adjustment, the slit is held in the lateral direction and prevented from being expanded in the lateral direction by the load applied in the tilt direction by the housing enclosing the outer pipe, and the tilt holding force can be increased.

This effect is explained below in greater detail. The separation section and clamping sections of the housing are provided on the lower side of the housing. The slit of the outer pipe is provided on the diametrically upper side of the outer pipe, that is, at a position of contact with the upper side of the housing, and enclosed by the enclosing main body section. Further, in the location where the slit of the outer pipe is provided, the enclosing main body section of the housing is continuous in the lateral direction. In other words, a structure is obtained in which the position of the slit of the outer pipe does not match the position of the separation section of the housing.

The enclosing main body section of the housing holds the slit location of the outer pipe in the lateral direction. Even if a tilting load acts to expand the slit, the counterforce generated in the enclosing main body section of the housing acts against the force created by the tilting load and expanding the slit. Therefore, the slit is prevented from expanding in the lateral direction. As a result, the deterioration caused by deformation from the vicinity of the slit of the outer pipe can be prevented.

Further, since the slit of the outer pipe is positioned on the diametrically upper side with respect to the separation section located on the lower side of the housing, when clamping is performed with the clamp, the outer pipe can be uniformly deformed in the diametrical direction. As a result, the inner pipe can be uniformly clamped, the clamping rigidity is stabilized, and the telescopic holding force is increased.

According to the second aspect of the present invention, the axially rear end section of the inner pipe is configured to be positioned inside the enclosing main body section of the housing. As a result, when tilt adjustment is performed, the protection of the location where the slit of the outer pipe has been formed can be further enhanced. In other words, where a certain external load acts upon the steering wheel in the tilt direction after the tilt and telescopic adjustment, a large load can be easily applied in a concentrated manner to the outer pipe at the axially rear end section of the inner pipe inserted into and connected to the outer pipe.

The axially rear end section of the inner pipe is inserted into the inner circumferential side of the outer pipe, and where a load is applied in the tilt direction, a load causing mutual bending of the inner pipe and lower pipe acts therebetween. In this case, since the axially rear end section of the inner pipe is positioned inside the enclosing main body section of the housing, a state is assumed in which the outer pipe corresponding to this portion is likewise covered by the upper continuous portion of the enclosing main body section of the housing, the outer pipe is protected to a greater degree, and the deterioration of the outer pipe caused by the deformation from the slit location can be prevented.

According to the third aspect of the present invention, the axially front end section of the outer pipe is configured to be positioned inside the enclosing main body section of the housing. Similarly to the case explained with reference to claim 2, when the tilt adjustment is performed, the protection of the location where the slit of the outer pipe is formed can be further enhanced. In other words, where a certain external load is applied in the tilt direction, the axially front end section of the outer pipe is a section where a load causing mutual bending of the inner pipe and outer pipe acts therebetween.

Therefore, by enclosing the axially front end section of the outer pipe with the enclosing main body section of the housing, it is possible to enhance further the protection of the outer pipe, and the outer pipe can be prevented from the deterioration from the slit location. Further, the site where the bending load acts between the outer pipe and inner pipe can be enclosed with the enclosing main body section and the tilt holding force can be increased regardless of the tilt and telescopic adjustment position.

According to the fourth aspect of the present invention, the stopper member is mounted at a position facing the slit of the outer pipe, that is, along the axial direction at a diametrically lower position. This constitutes a configuration in which the stopper member is at the separation section. With such a configuration, the outer pipe is reinforced by the stopper member at a position opposite the slit formation side in the diametrical direction.

According to the fifth aspect of the present invention, similarly to the first aspect, even if a load in the tilt direction is applied to the slit formation location of the outer pipe after the tilt and telescoping adjustment, the slit is held in the lateral direction and prevented from being expanded in the lateral direction by the load in the tilt direction by the housing enclosing the outer pipe, and the tilt holding force can be increased.

DESCRIPTION OF THE PREFERRED EMBODIMENTS

An embodiment of the present invention will be described below with reference to the appended drawings. In the present invention, a front-rear direction is set as explained below. In a state in which the steering device in accordance with the present invention is mounted on an automobile, the side corresponding to the front side of the automobile is taken as a "front side" and the side corresponding to the rear side of the automobile is taken as a "rear side" with reference to the front-rear direction of the automobile. Further, the direction connecting the front side and the rear side is called an "axial direction". A "lateral direction" as referred to herein represents the left-right direction of the automobile. The arrows indicating the axial direction, front side, rear side, and lateral direction are shown in the figures.

Figure 1A:
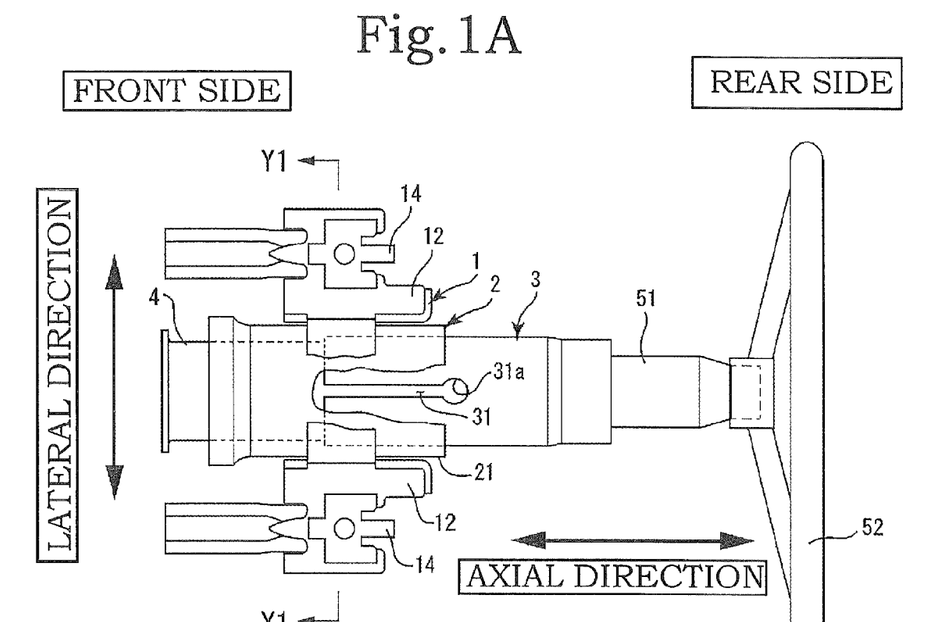
FIG. 1A is a partially cut-out plan view illustrating the present invention.

As shown in FIG. 1, the principal configuration in accordance with the present invention is constituted by a fixed bracket 1, a housing 2, a clamp 6, an outer pipe 3, and an inner pipe 4. The fixed bracket 1 is constituted by fixed side sections 11 formed at each side in the lateral direction and an attachment section 12. A long hole for tilt adjustment which extends in a substantially up-down direction or longitudinal direction is formed in each of the fixed side sections 11. A capsule member 14 is mounted on the attachment section 12, and the fixed bracket 1 is mounted on a predetermined position of a vehicle body by the capsule member 14.

Figure 1B:
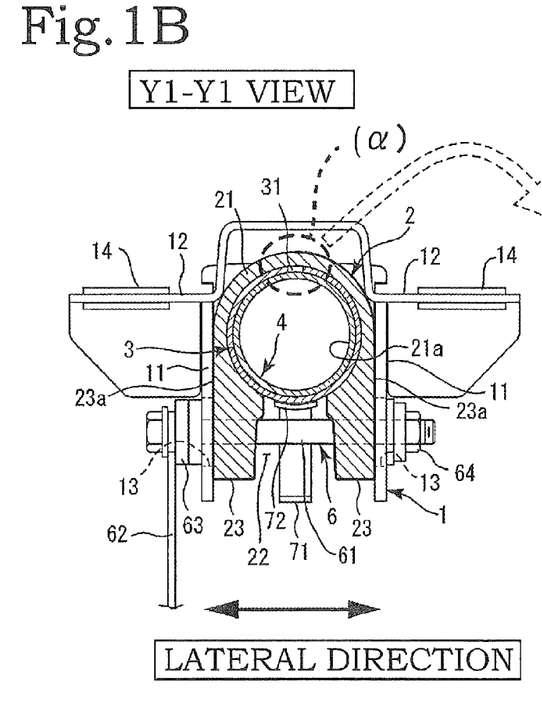
FIG. 1B is a cross-sectional view in which the view taken along Y1-Y1 in FIG. 1A is rearranged in the up-down direction.
Figure 1C:
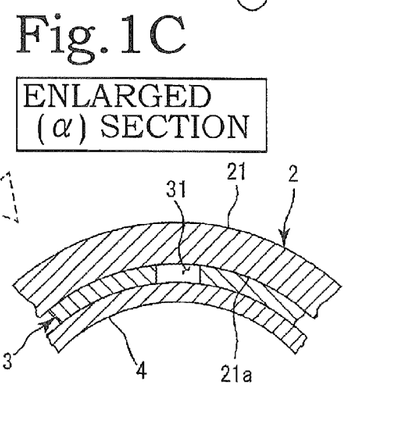
FIG. 1C is an enlarged view of the (a) section in FIG. 1B.
Figure 3:
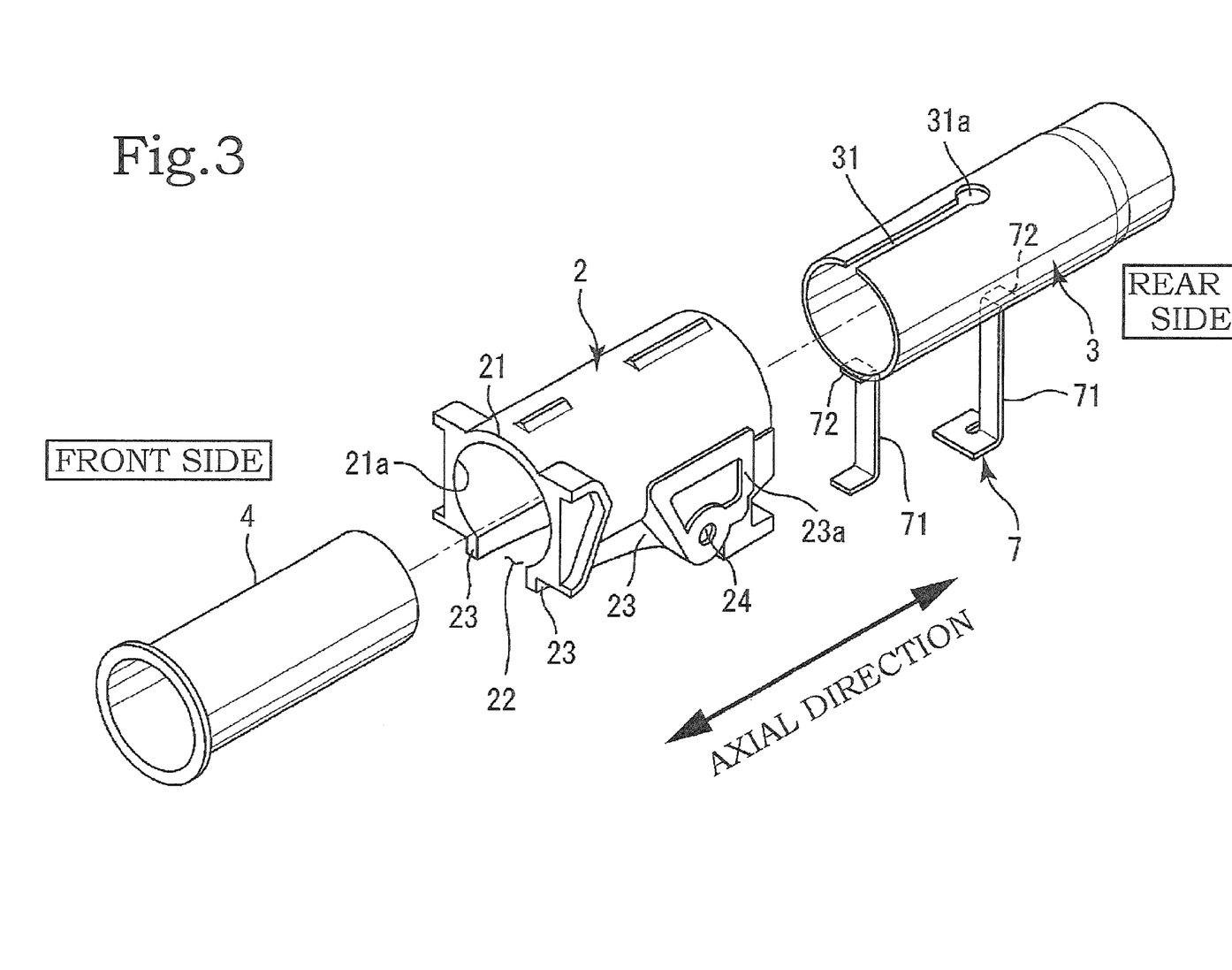
FIG. 3 is a perspective view illustrating the state in which the housing, outer pipe, and inner pipe are disassembled.
Figure 6A:
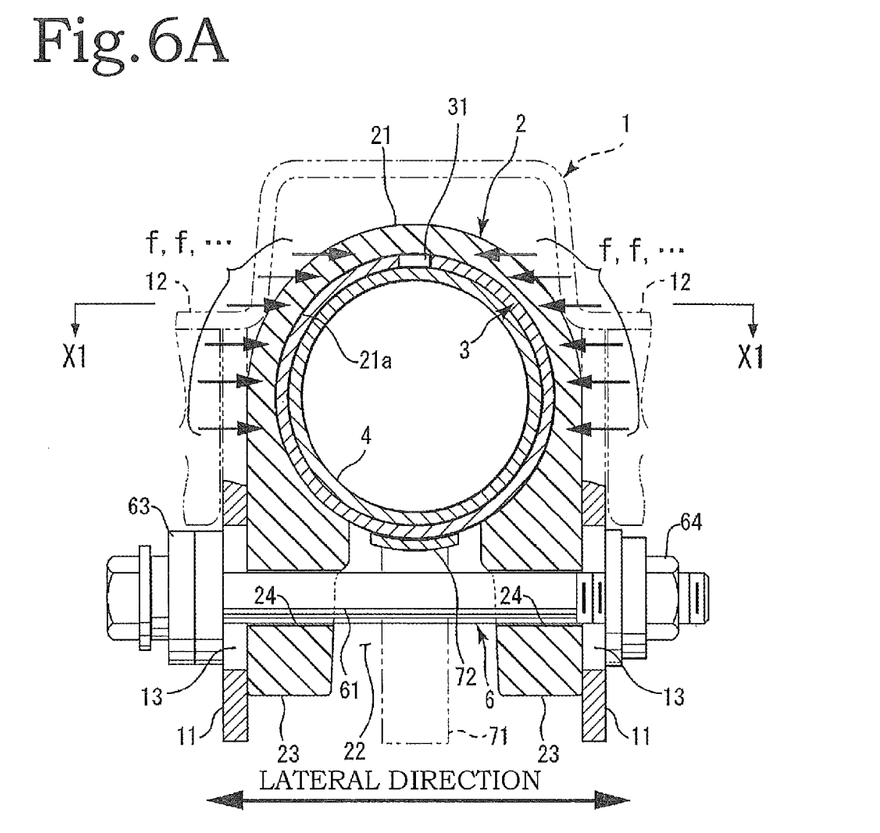
FIG. 6A is a cross-sectional view of a simplified partial configuration in which the structure protecting the slit during the tilt adjustment is viewed from the axially rear side.
Figure 6B:
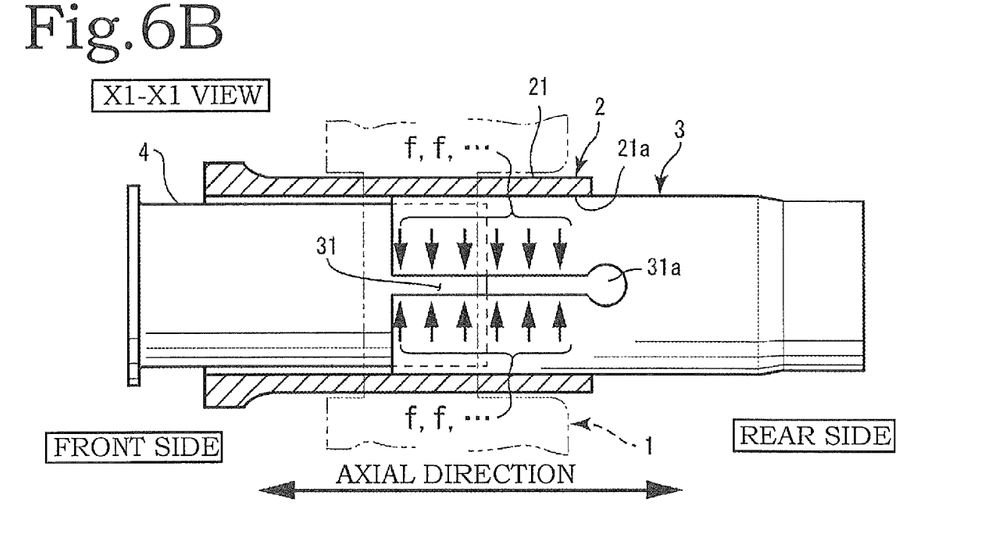
FIG. 6B is a cross-sectional view in which the view taken along X1-X1 in FIG. 6A is rearranged in the horizontal direction.

The housing 2 is mainly composed of an aluminum alloy and constituted by an enclosing main body section 21 and two clamping sections 23 (see FIGS. 1B, 3, and 6). Further, the enclosing main body section 21 is formed in a substantially cylindrical shape and has a hollow interior with an inner circumferential side surface section 21a formed therein. The enclosing main body section 21 is designed to enclose the outer pipe 3 (see FIG. 1B).

A separation section 22 is formed at the diametrically lower side of the enclosing main body section 21 (see FIG. 3). The separation section 22 can be formed from the axially rear side to the axially front side of the enclosing main body section 21 along the entire length thereof, or part of the enclosing main body section can be left at the front side thereof. The separation section 22 is also a portion formed as an opening in the diametrically lower section of the enclosing main body section 21 (see FIG. 3).

The two clamping sections 23 are formed at each side location, in the lateral direction, of the separation section 22 in the diametrically lower section of the enclosing main body section 21. The two clamping sections 23 have the same shape and are formed in a substantially thick plate shape. The clamping sections are formed along the axial direction of the housing 2 and extend substantially downward from the lower section of the enclosing main body section 21. The two clamping sections 23 are disposed symmetrically in the left-right direction and parallel (inclusive of substantially parallel) to each other in the lateral direction of the separation section 22 and are formed integrally with the enclosing main body section 21.

Flat outer surface sections 23a slightly protruding from both sides, in the horizontal direction, of the enclosing main body section 21 are formed at the outer side surfaces at both sides in the lateral direction on the axially rear side of the clamping sections 23 (see FIG. 3). The flat outer surface sections 23a are formed integrally at the axially rear side of the enclosing main body section 21 and below the substantially medium location in the up-down direction.

The flat outer surface sections 23a are clamped by the fixed side sections 11 of the fixed bracket 1, and the fixed side section 11 and the flat outer surface section 23a are in surface contact (inclusive of substantial surface contact) with each other (see FIG. 13). Clamping holes 24 are formed in the clamping sections 23 in the direction orthogonal to the front-rear direction of the housing 2 and along the lateral direction of the enclosing main body section 21. A bolt shaft 61 of the below-described clamp 6 is inserted through the clamping holes 24.

The outer pipe 3 is formed in a hollow cylindrical shape and mounted on the enclosing main body section 21 of the housing 2 (see FIG. 3). A slit 31 is formed in the outer pipe 3 along the axial direction from the end surface on the front side of the vehicle body. The slit 31 is formed as far as the vicinity of the substantially medium location in the axial direction of the outer pipe 3.

A round end section 31a in the form of a round through hole is formed at the axially distal end of the slit 31. The diameter of the round end section 31a is larger than the grove width of the slit 31 and facilitates the expansion and contraction of the slit 31. The outer pipe 3 is enclosed by the enclosing main body section 21 of the housing 2. In this case, the outer pipe 3 is mounted on the housing 2 so that the slit 31 is positioned on the upper side at all times.

The slit 31 is designed such that the width of the slit 31 is reduced and the diameter of the outer pipe 3 is also reduced when the housing 2 is clamped together with the fixed bracket 1 by the clamp 6 during tilt and telescopic adjustment. As a result, the outer pipe 3 clamps the inner pipe 4 connected thereto in the axial direction and the two pipes are locked together.

Figure 5:
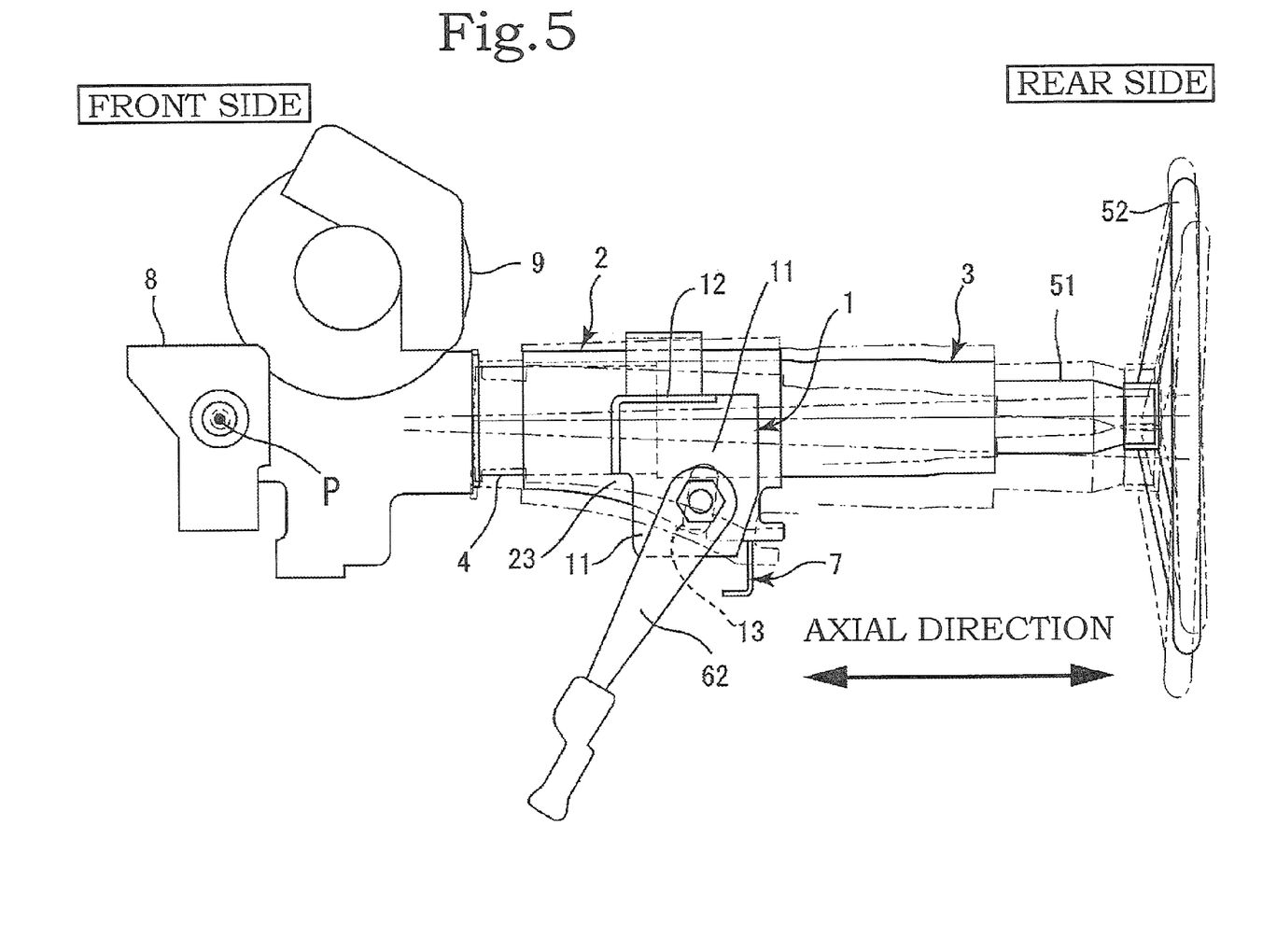
FIG. 5 is a side view illustrating the state in which the power unit and lower bracket are mounted in accordance with the present invention.

The inner pipe 4 is formed in a hollow cylindrical shape and connected to a motor housing of a power unit 9 for electric power steering and a lower bracket 8 for tilting. The lower bracket 8 has a swinging center P for tilt adjustment together with the inner pipe 4 and the power unit 9, and a steering wheel 52 can move in the up-down direction about the swinging center P as a center during tilt adjustment (see FIG. 5). The inner pipe 4 and the housing 2 maintain the same positions with respect to each other at all times, without positional variations in the axial direction.

Figure 2A:
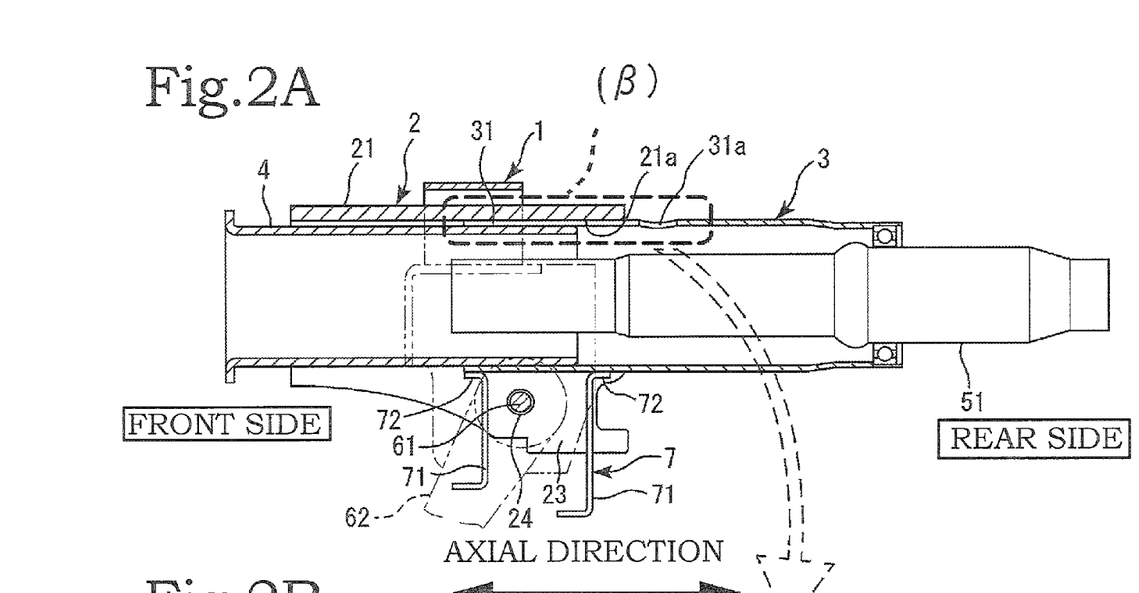
FIG. 2A is a partially cross-cut side view illustrating the state in which the fixed bracket, housing, outer pipe, inner pipe, and steering shaft are assembled in accordance with the present invention.
Figure 2B:
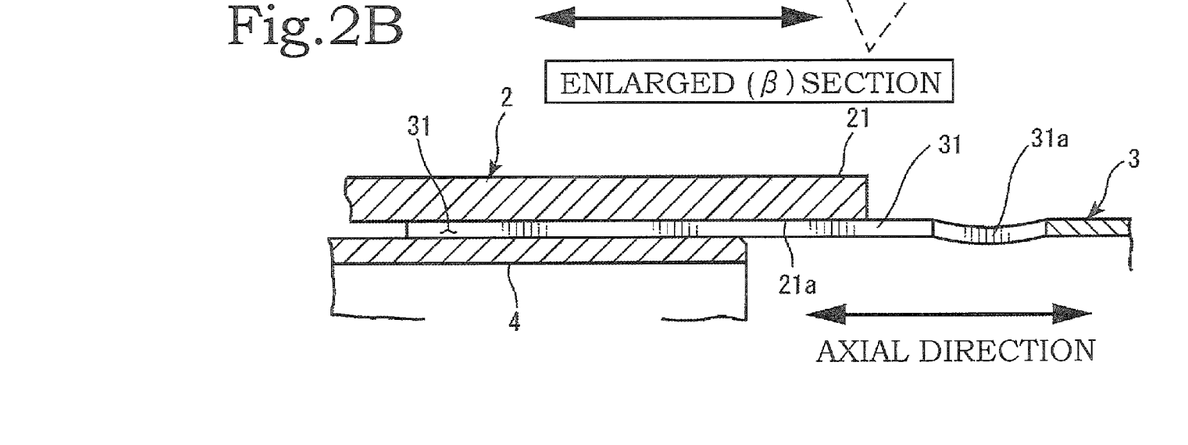
FIG. 2B is an enlarged view of the (β) section in FIG. 2A.
Figure 4:
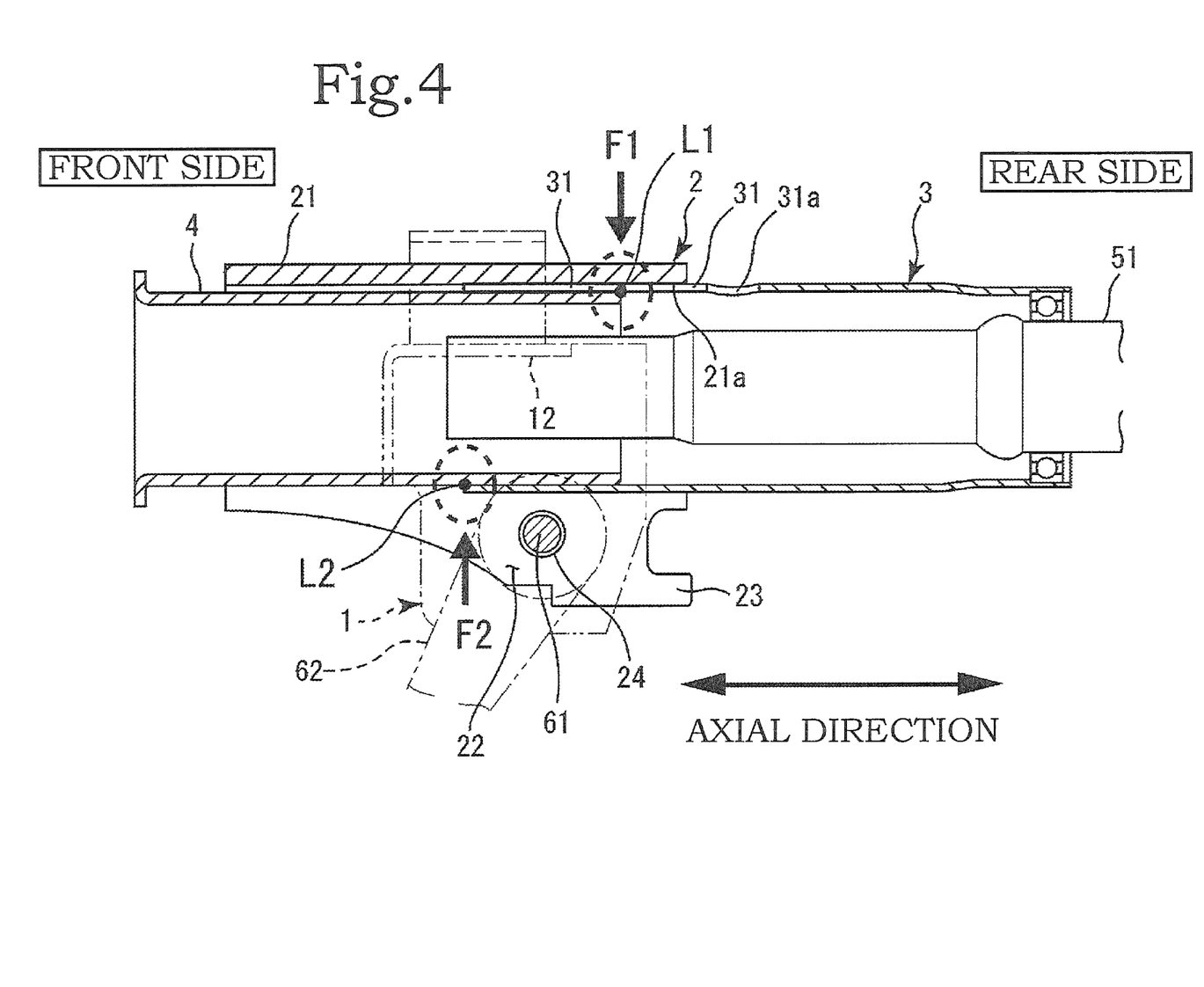
FIG. 4 a vertical sectional view illustrating how a load is applied in the tilt direction to the housing, outer pipe and inner pipe.

Further, the position of the axially rear end section of the inner pipe 4 is set such as to be confined within the axial range of the inner circumferential side surface section 21a in the enclosing main body section 21 of the housing 2 (see FIGS. 2A and 4). In other words, the axially rear end section of the inner pipe 4 does not protrude from the axially rear end section of the enclosing main body section 21 of the housing 2.

In such a configuration, the axially rear side of the inner pipe 4 is inserted from the axially front side of the outer pipe 3 (see FIG. 2A). The outer pipe 3 is configured to be axially swingable with respect to the inner pipe 4. In other words, in such a structure, only the outer pipe 3 moves in the axial direction with respect to the housing 2 and the inner pipe 4.

As mentioned hereinabove, the inner pipe 4 is configured to be connected to the motor housing of the power unit 9 such as electric power steering, but the power unit 9 is not particularly limited to the electric power steering, and a combination with the power unit 9 of a hydraulic type may be also used. In another possible configuration, the inner pipe 4 can be directly connected to the lower bracket 8 for tilting, rather than through the power unit 9.

The clamp 6 is constituted by the bolt shaft 61, an operation lever section 62, a clamping cam 63, and a clamping nut 64. The bolt shaft 61 is inserted into the long holes 13 for tilt adjustment of the fixed side sections 11 of the fixed bracket 1 and the clamping holes 24 of the housing 2. The operation lever section 62 and the clamping cam 63 are disposed at one lateral side of the fixed bracket 1, and the clamping nut 64 is amounted on the other side (see FIG. 1B).

Where the clamping operation of the operation lever unit 62 of the clamp 6 is performed, the distance between the clamping sections 23 of the housing 2 and the lateral spacing of the separation section 22 are reduced and the diameter of the inner circumferential side surface section 21a of the enclosing main body section 21 is also reduced. As a result, the outer pipe 3 accommodated in and mounted on the inner circumferential side surface section 21a of the enclosing main body section 21 is clamped and fixed (locked). In the outer pipe 3, the lateral spacing of the slit 31 is reduced, and the inner pipe 4 inserted axially into the outer pipe 3 is clamped by the outer pipe 3 and the two pipes are locked together.

A stopper member 7 is mounted on the upper pipe 3 (see FIGS. 1B and 3). More specifically, the stopper member 7 is constituted by two stopper plates 71. The stopper plates 71 are fixedly attached by the respective attachment pieces 72 to the diametrically lower surface side at the axially front side of the upper pipe 3. The attachment piece 72 is a plate piece obtained by bending the upper end of the stopper plate 71 at a right angle thereto. The stopper member 7 moves together with the outer pipe 3. The stopper plates 71 are disposed inside the separation section 22 of the housing 2. As a result, a structure locking the rotation in the circumferential direction of the outer pipe 3 with respect to the housing 2 is configured.

In a state in which the fixed bracket 1, housing 2, outer pipe 3, and inner pipe 4 are assembled by the clamp 6, the bolt shaft 61 of the clamp 6 is disposed between the two stopper plates 71 facing each other along the axial direction (see FIG. 2A). The amount of movement of the outer pipe 3 in the front-rear direction during the telescopic operation is determined by the distance between the stopper plates 71.

In another embodiment, the stopper member 7 is constituted by the stopper plates 71 and an attachment piece 72 formed as a thin long plate. The stopper plates 71 are integrally formed at both ends of the attachment piece 72 in the longitudinal direction thereto. The attachment piece 72 is disposed inside the separation section 22 of the housing 2 (see FIG. 6A).

A steering shaft 51 is internally fitted into the outer pipe 3 and the inner pipe 4. The steering wheel 52 is mounted on the axially rear end section of the steering shaft 51 (see FIGS. 1A and 5). The steering shaft 51 has a telescopic structure in the axial direction.

A slit 31 formed at the diametrically upper section of the outer pipe 3 is disposed so as to be positioned in the diametrically upper location of the inner circumferential surface section 21a of the enclosing main body section 21 of the housing 2. Thus, the slit 31 of the outer pipe 3 has a structure covered by a portion which is the continuation of the upper portion of the enclosing main body section 21 of the housing 2 (see FIGS. 1B, 1C, 2, 6A, and 7).

Therefore, the slit 31 of the outer pipe 3 is protected by the continuation portion of the upper portion of the inner circumferential surface section 21a of the enclosing main body section 21, and the expansion of the slit 31 is prevented by the clamping force of the enclosing main body section 21 acting against the outer force trying to cause the lateral expansion by the inner pipe 4 during the tilting operation.

Where a load in the tilt direction is applied to the steering wheel 52, a load in the tilt direction is also applied to the outer pipe 3. A particularly large load is applied in two locations. The first location is the location that is in contact with the diametrically upper section at the axially rear end of the inner pipe 4 inserted into the outer pipe 3, and this position will be referred to as a first load point L1 to which a tilt load F1 is applied (see FIG. 4). The second location to which a large load is applied is the location of the front end section, in the front-rear direction of the vehicle body, at a position of the diametrically lower section at the axially front end of the outer pipe 3. This position will be referred to as a second load point L2 to which a tilt load F2 is applied (see FIG. 4).

The axially rear end section of the inner pipe 4 and the axially front end section of the outer pipe 3 are positioned inside the enclosing main body section 21 of the housing 2.

Therefore, the first load point L1 and the second load point L2 are both positioned inside the enclosing main body section 21. Further, the first load point L1 is positioned inside the axial range of the slit 31. Where a load is applied in the tilt direction, a load acts such that bends the outer pipe 3 with respect to the inner pipe 4, and this load acts to deform the slit 31.

Figure 7A:
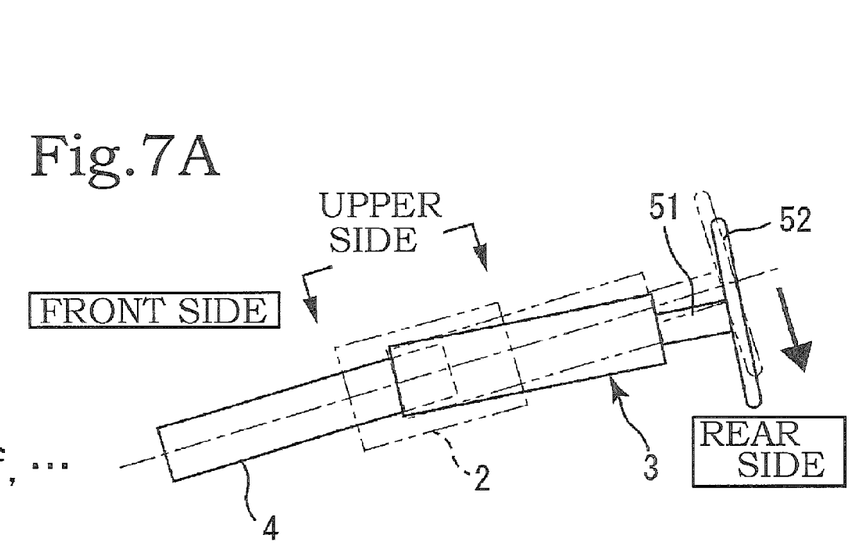
FIG. 7A is a simplified view specifically illustrating the state in which the outer pipe and inner pipe are mutually bent when a load acts in the tilt direction.
Figure 7B:
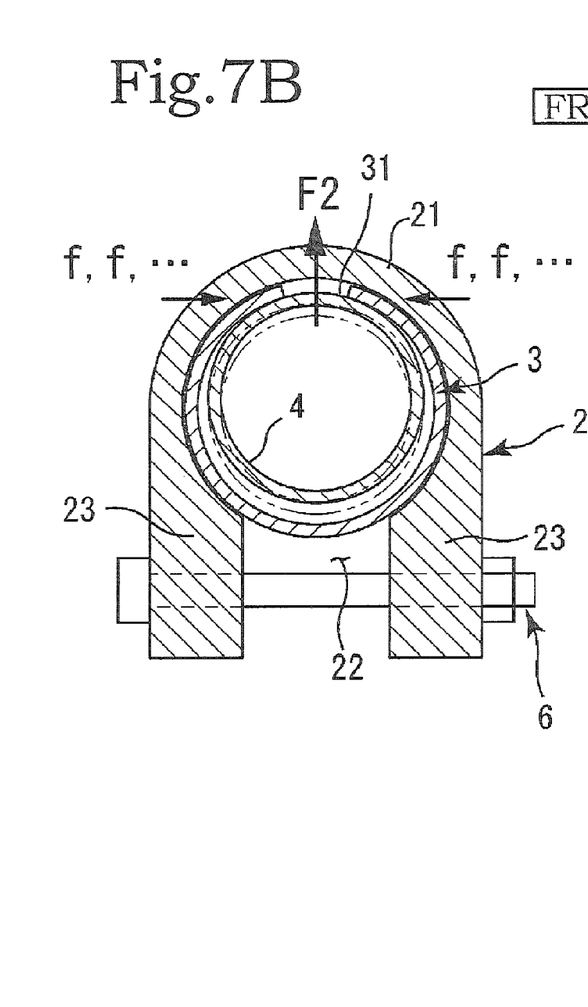
FIG. 7B is a simplified view illustrating the state in which the slit is prevented from being expanded by the inner pipe.
Figure 7C:
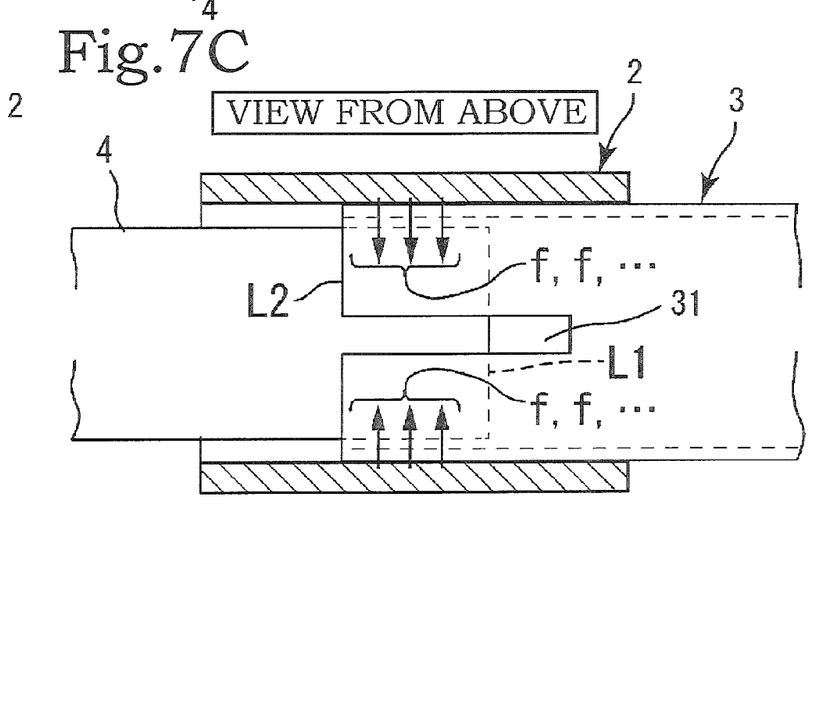
FIG. 7C is a top view illustrating the state shown in FIG. 7A.

However, the first load point L1 is positioned inside the enclosing main body section 21 and covered and protected by the inner circumferential surface section 21a, whereby the deformation of the slit 31 is prevented in any of the largest extension state, neutral state, and largest contraction state during the telescopic adjustment (see FIG. 7). Further, the first load point L1 is positioned at the axially rear side where the slit 31 is closed, and the strength therein is higher than that on the axially front side where the slit 31 is opened. As a result, the deformation of the slit 31 is prevented even more effectively.

At both sides, in the lateral direction, of the slit 31, pushing forces f act on the circumference of the slit 31 as counterforces acting from the inner circumferential surface section 21a of the enclosing main body section 21 of the housing 2 against the tilt load F1 acting from the inner pipe 4 to expand the slit 31 during the tilt adjustment (see FIGS. 6 and 7). As a result, the slit 31 can be prevented from being excessively expanded by the inner pipe 4, and the deterioration of the outer pipe 3 from the slit 31 side can be prevented.

In accordance with the present invention, the slit 31 of the outer pipe 3 is positioned on the upper side, and the slit 31 is protected by the enclosing main body section 21 of the housing 2. Therefore, the outer pipe 3 can have sufficient durability with respect to the load on the outer pipe 3 that is generated when the steering wheel 52 moves downward during the tilt adjustment.

A load F2 in the direction opposite to the tilt direction is applied, as a counterforce to the load F1 applied to the first load point L1, to the second load point L2 (see FIG. 4). Since the slit 31 is not present in the second load point L2, the slit 31 is not affected by the load F2 acting in the second load point L2 and can be prevented from being deformed. Further, because of the location where the stopper member 7 is mounted on the outer pipe 3, the outer pipe 3 is reinforced and prevented from being deformed.

In the locked state, the inner circumferential surface section 21a of the enclosing main body section 21 applies a pressure via the clamp 6 such as to narrow the slit 31 in the lateral direction. Therefore, the slit 31 demonstrates a sufficient resistance to the tilt load F1 in the first load point L1, the deformation of the slit 31 can be prevented, and a strong holding rigidity can be ensured.

Figure 9A:
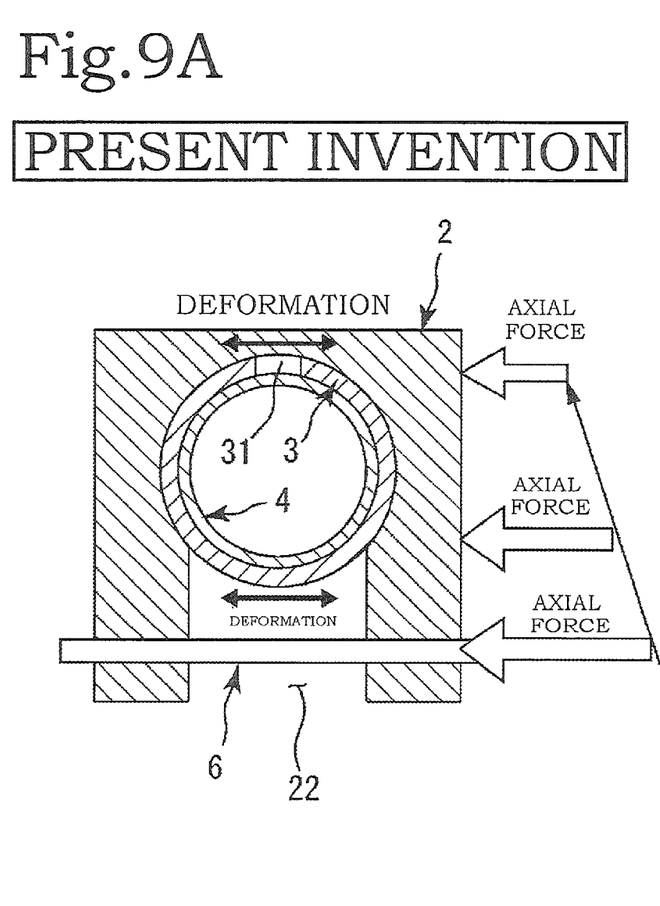
FIG. 9A is a simplified cross-sectional view illustrating the operation performed by the configuration in accordance with the present invention.
Figure 9B:
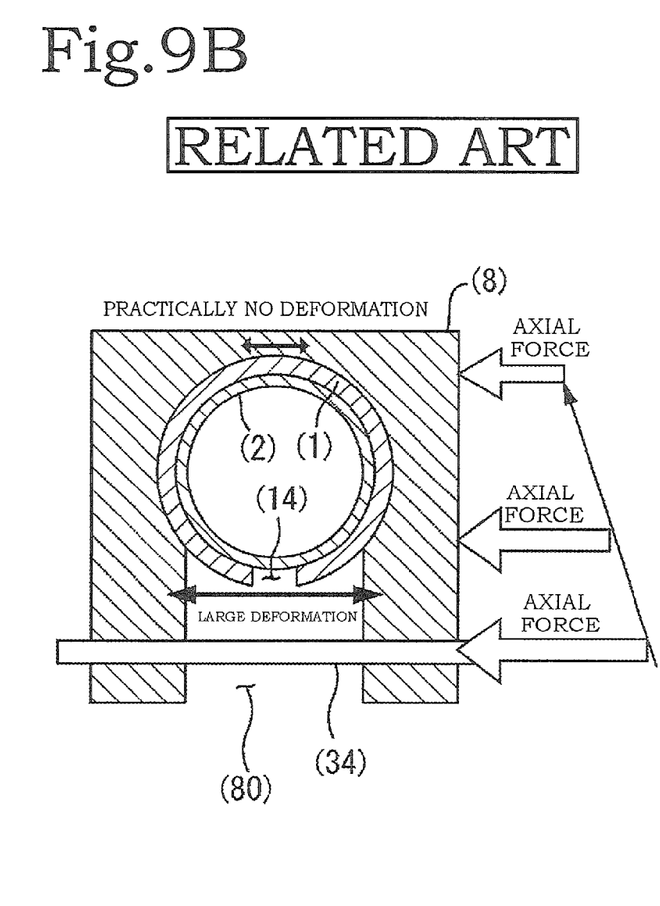
FIG. 9B is a simplified cross-sectional view illustrating the operation performed by the configuration in accordance with the related art.

In the conventional configuration, the separation section (80) of the clamp member (8) and the slit (14) of the outer column (1) are both positioned at the diametrically lower side (see FIGS. 9B and 10). Therefore, when clamping is performed with a clamping rod (34), the axial force generated by clamping of the clamping rod (34) and acting on the clamp member (8) becomes large at the diametrically lower side where the separation section (80) is positioned and becomes small at the diametrically upper side.

As a result, in the conventional configuration, the clamp member (8) deforms on the lower side so as to reduce the distance between the separation section (80) and the slit (14) of the outer column (1) and practically does not deform on the diametrically upper side. In other words, a structure is obtained in which the upper side of the clamp member (8) and the upper side of the outer column (1) constitute a continuous region, the lower side of the clamp member (8) and the lower side of the outer column (1) become the positions of the separation section (80) and the slit (14), and the lower side is easier contracted in the lateral direction than the upper side.

As a consequence, in the conventional configuration, the amount of deformation of the outer column (1) is large on the lower side where the slit (14) is formed, and small at the upper side. As a result, in the conventional configuration, there is a large difference in the amount of deformation between the diametrically lower side and upper side in the outer column (1), and the force clamping the inner column (2) becomes nonuniform (see FIG. 9B). Where the clamping force becomes nonuniform, the clamping rigidity becomes unstable and the tilt-telescopic holding force also becomes unstable. The reference numerals in the parentheses are those of the related art.

By contrast, in the present invention, the separation section 22 of the housing 2 and the slit 31 of the outer pipe 3 are positioned opposite each other in the diametrical direction (see FIGS. 7 and 9A). As a result, even on the diametrically upper side of the housing 2 where the axial force of the bolt shaft 61 is small during clamping with the clamp 6, the outer pipe 3 is easily deformed due to the slit 31, and the amount of deformation of the outer pipe 3 can be made uniform on the diametrically upper and lower sides. As a consequence, the force by which the outer pipe 3 clamps the inner pipe 4 becomes uniform, the clamping rigidity is stabilized, and the tilt-telescopic holding force is increased.

Further, since the connection portion of the outer pipe 3 and the inner pipe 4 is clamped by the housing 2 and the clamp 6, the friction resistance is generated between the outer pipe 3 and the inner pipe 4 and between the outer piper 3 and the housing 2, the contact surface area can be easily increased with a simple structure, and a strong telescopic holding force can be obtained.

During the telescopic operation, the structure is realized in which only the upper pipe 3 slides in the axial direction, and in this configuration, the housing 2 and the inner pipe 4 do not move in the axial direction. Therefore, it is not necessary to form a long hole for telescopic adjustment, as in the conventional configuration, in the housing 2 and the rigidity of the housing 2 can be prevented from reducing.

Figure 8:
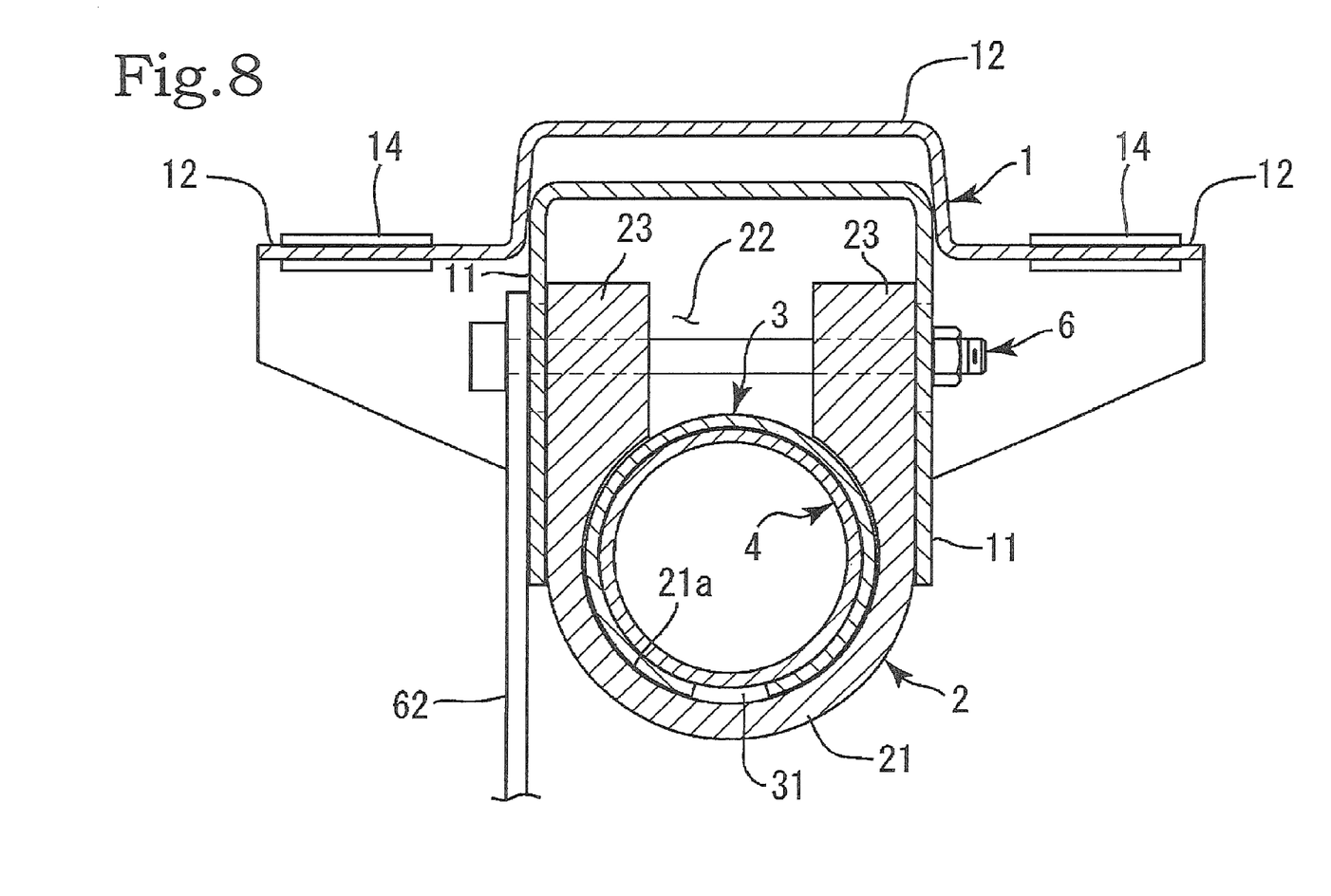
FIG. 8 is a simplified cross-sectional view illustrating the embodiment in which the separation section of the enclosing main body section is on the upper side and the slit of the outer pipe is on the lower side in accordance with the present invention.

FIG. 8 illustrates an embodiment in which the separation section 22 is formed on the upper side of the enclosing main body section 21 of the housing 2, and the slit 31 of the outer pipe 3 is positioned on the lower side. In other words, in accordance with the present invention, the mutual arrangement of the separation section 22 of the enclosing main body section 21 and the slit 31 of the outer pipe 3 can be reversed in the up-down direction.

What is claimed is:

1. A steering device comprising:
    a housing constituted by an enclosing main body section, a separation section formed on a lower side of the enclosing main body section along an axial direction thereof, and clamping sections formed respectively on two sides of the enclosing main body section so as to face each other in a lateral direction of the separation section;
    a fixed bracket having fixed side sections that clamp the housing at two sides in the lateral direction;
    a clamp that clamps the two clamping sections of the housing and the two fixed side sections of the fixed bracket;
    an outer pipe having at an axially front side thereof a slit formed in the axial direction; and
    an inner pipe inserted into an inner circumferential side of the outer pipe, wherein the slit of the outer pipe is configured to be positioned only on an upper side and be enclosed by the enclosing main body section, wherein the slit is configured such that a position of the slit of the outer pipe does not match a position of the separation section of the housing, and wherein the slit is designed such that a width of the slit is reduced and a diameter of the outer pipe is reduced when the housing is clamped together with the fixed bracket by the clamp during tilt and telescopic adjustment.

2. The steering device according to claim 1, wherein an axially rear end section of the inner pipe is configured to be positioned inside the enclosing main body section of the housing.

3. The steering device according to claim 2, wherein an axially front end section of the outer pipe is configured to be positioned inside the enclosing main body section of the housing.

4. The steering device according to claim 2, wherein a stopper member is mounted along the axial direction at a diametrically lower position with respect to the slit of the outer pipe, and the stopper section is positioned in the separation section.

5. The steering device according to claim 1, wherein an axially front end section of the outer pipe is configured to be positioned inside the enclosing main body section of the housing.

6. The steering device according to claim 5, wherein a stopper member is mounted along the axial direction at a diametrically lower position with respect to the slit of the outer pipe, and the stopper section is positioned in the separation section.

7. The steering device according to claim 1, wherein a stopper member is mounted along the axial direction at a diametrically lower position with respect to the slit of the outer pipe, and the stopper section is positioned in the separation section.

8. The steering device according to claim 1, wherein the enclosing main body section of the housing holds a location of the slit of the outer pipe in the lateral direction.

9. The steering device according to claim 1, wherein the slit of the outer pipe is positioned on a diametrically upper side with respect to the separation section located on the lower side of the housing.

10. The steering device according to claim 1, wherein the enclosing main body section further comprises a hollow interior with an inner circumferential side surface section formed therein, and wherein the slit of the outer pipe is covered by a continuation portion of the upper portion of the inner circumferential surface section.

11. The steering device according to claim 1, wherein the enclosing main body section is configured to enclose the outer pipe.

12. The steering device according to claim 1, wherein the separation section of the housing and the slit of the outer are positioned opposite each other in a diametrical direction.

13. A steering device comprising:

a housing constituted by an enclosing main body section, a separation section formed on an upper side of the enclosing main body section along an axial direction thereof, and clamping sections formed respectively on two sides of the enclosing main body section so as to face each other in a lateral direction of the separation section;

a fixed bracket having fixed side sections that clamp the housing at two sides in the lateral direction;

a clamp that clamps the two clamping sections of the housing and the two fixed side sections of the fixed bracket;

an outer pipe having at an axially front side thereof a slit formed in the axial direction; and an inner pipe inserted into an inner circumferential side of the outer pipe, wherein the slit of the outer pipe is configured to be positioned only on a lower side and be enclosed by the enclosing main body section, wherein the slit is configured such that a position of the slit of the outer pipe does not match a position of the separation section of the housing, and wherein the slit is designed such that a width of the slit is reduced and a diameter of the outer pipe is reduced when the housing is clamped together with the fixed bracket by the clamp during tilt and telescopic adjustment.

14. The steering device according to claim 13, wherein the enclosing main body section of the housing holds a location of the slit of the outer pipe in the lateral direction.

15. The steering device according to claim 13, wherein the slit of the outer pipe is positioned on a diametrically upper side with respect to the separation section located on the lower side of the housing.

16. The steering device according to claim 13, wherein the enclosing main body section further comprises a hollow interior with an inner circumferential side surface section formed therein, and wherein the slit of the outer pipe is covered by a continuation portion of the upper portion of the inner circumferential surface section.

17. The steering device according to claim 13, wherein the enclosing main body section is configured to enclose the outer pipe.

18. The steering device according to claim 13, wherein the separation section of the housing and the slit of the outer are positioned opposite each other in a diametrical direction.

19. A steering device comprising:

a housing constituted by an enclosing main body section, a separation section formed on a lower side of the enclosing main body section along an axial direction thereof, and clamping sections formed respectively on two sides of the enclosing main body section so as to face each other in a lateral direction of the separation section;

a fixed bracket having fixed side sections that clamp the housing at two sides in the lateral direction;

a clamp that clamps the two clamping sections of the housing and the two fixed side sections of the fixed bracket;

an outer pipe having at an axially front side thereof a slit formed in the axial direction; and an inner pipe inserted into an inner circumferential side of the outer pipe, wherein a stopper member is mounted along the axial direction at a diametrically lower position with respect to the slit of the outer pipe, and the stopper section is positioned in the separation section, and wherein the slit of the outer pipe is configured to be positioned on an upper side of the enclosing main body and to be enclosed by the enclosing main body section.

* * * * *